(12) United States Patent
Miele et al.

(10) Patent No.: US 6,379,413 B1
(45) Date of Patent: Apr. 30, 2002

(54) MICRO GRANULAR FERTILIZER FOR THE PREVENTION AND TREATMENT OF IRON CHLOROSIS

(75) Inventors: Sergio Miele, Pisa; Enrica Bargiacchi, Castiglioncello, both of (IT)

(73) Assignee: Agroqualita' S.r.l,, Milan (IT)

( * ) Notice: Subject to any disclaimer, the term of this patent is extended or adjusted under 35 U.S.C. 154(b) by 0 days.

(21) Appl. No.: 09/450,009

(22) Filed: Nov. 29, 1999

(51) Int. Cl.$^7$ .................................................. C05F 1/00
(52) U.S. Cl. ................................................. 71/17; 71/11
(58) Field of Search ................................ 71/11, 17, 25, 71/32, 54

(56) References Cited

U.S. PATENT DOCUMENTS

| | | | | |
|---|---|---|---|---|
| 290,829 A | * | 12/1883 | Wilkinson | 71/17 |
| 3,669,898 A | * | 6/1972 | Butler | 252/307 |
| 4,575,391 A | * | 3/1986 | DeBoodt et al. | 71/28 |
| 5,698,001 A | * | 12/1997 | Keenportz | 71/903 |
| 5,772,721 A | * | 6/1998 | Kazemzadeh | 71/11 |
| 5,797,976 A | * | 8/1998 | Yamashita | 71/26 |

FOREIGN PATENT DOCUMENTS

| | | |
|---|---|---|
| DE | 31 02 052 | 8/1982 |
| DE | 43 23 603 | 9/1994 |
| EP | 0 968 980 | 1/2000 |

* cited by examiner

Primary Examiner—Wayne Langel
(74) Attorney, Agent, or Firm—Guido Modiano; Albert Josif; Daniel O'Byrne

(57) ABSTRACT

The present invention relates to a micro granular fertilizer for the prevention and treatment of Iron chlorosis based on the association of animal blood, a ferrous salt and a lignine derivative. The fertilizer is provided in the granular form with the granules having a size of 0.1 to 1.5 mm to be localized along plant rows or applied to spouted lawns.

15 Claims, No Drawings

MICRO GRANULAR FERTILIZER FOR THE PREVENTION AND TREATMENT OF IRON CHLOROSIS

BACKGROUND OF THE INVENTION

The present invention relates to a micro granular fertilizer for the prevention and treatment of Iron chlorosis.

1. Field of the invention

Iron deficiency in soils, which is evidenced by the condition of Iron chlorosis, is still today one of the major agronomic problems in the fertilization of tree crops, vineyards, and many types of plants, above all vegetables and lawns.

This deficiency is particularly evident in calcareous soil or following soil compaction at low temperatures.

In such conditions, the use of Iron based mineral fertilizers, of the ferrous sulphate heptahydrate type, is usually ineffective because of reactions with the carbonates of the soil, absorption by the clay minerals, and transformation of the ions $Fe^{2+}$ into $Fe^{3+}$ which are less available and absorbable by plants (W. L. Lindsay, 1979, "Chemical Equilibria in Soils", J. Wiley and Sons N.Y.; Sahrawat K. L. in Fertilizers Res. 1988, 16; 31—31). For this reason, together with grafting and the use of species tolerant to Iron chlorosis, agrochemical research had mainly been aimed at the study and use of expensive Iron chelates which are stable after application to the soil, such as FeEDDHA, FeEDDHSA, FeEDDHMA etc.

However, further research has been carried out in order to find particular formulations of less expensive sources which still have an agronomic efficiency comparable to the mentioned soil applied chelates, and possible further advantages such as a more prolonged efficiency of Iron and less susceptibility to the negative incidence of leaching.

The addition of acidifying substances, e.g. ammonium sulphate and citric acid or humus substances to ferrous sulphate heptahydrate tends to have variable results of generally brief duration.

2. Description of the Prior Art

It is known from C. Natt (J. Plant Nutr. 1992, 15: 1891–1912), the possibility of using ferrous sulphate heptahydrate, FeEDTA (an Iron chelate of low stability in soil with pH>6) and a combination of both, in resin-coated formulations, to obtain a release of Iron which has a constant availability for the entire growth period. The results, however, show that these coated products tend to be effective only under fully irrigated conditions.

It is also known the use of natural substances which are rich in Iron in naturally chelated forms, such as animal blood.

M. Kalbasi and H. Shariamadari disclose in J. Plant Nutr. 1993, 16:2213–2223 the use of dried chicken blood as a source of Iron for plants in hydroponic cultivation. In these conditions, 10–15 mg of chicken blood per kg, by means of liquid, was as effective as 2.5 mg Fe from FeEDDHA. In this source, Iron is present as $Fe^{2+}$ in the heme group of the molecule of the hemoglobin at the ratio of 0.2–0.3% w/w. The stability of this natural chelate is high in neutral and slightly acid solutions, so much so that, with total contents of Iron of, for example, 2100 mg/kg, it can be seen that the extraction in water can remove only 2.6 mg/kg of Fe, while in 0.1 M $CaCl_2$ at pH 4.0 there is only 5.0 mg/kg of Fe.

It is further known a study about the evolution of animal blood in the soil, by C. Ciavatta et al. (J. Plant Nutr. 1997, 20:1573–1591) in which it is stated that the availability of Iron contained therein tended to increase following the gradual degradation of the prosthetic group and the subsequent chelation of the humus which would be generated in the course of the evolution of the blood itself in the soil. Similar results were noted with Magnesium. Both these effects tend to appear clearly 120 days after the beginning of the degradation process.

G. Davies and E. A. Ghabbour (Chemistry and Industry; Jun., 7, 1999; 426–429) suggested that the chelating strength of the humus for Iron is essentially dependent on the presence of carboxylates.

The prior art techniques for the treatment and prevention of Iron chlorosis currently available show some limits. In particular, for the traditional soil-applied chelates there exists the need for undesirable repeated treatments to avoid the risk of loss through leaching.

A further disadvantage of the prior art consists in the variable efficiency, depending on the source used and the rate of application.

Another disadvantage of the prior art consists in the poor results achieved in non irrigated areas by the application of products containing ferrous sulphate heptahydratic in coated formulations, and also in the form of FeEDTA mixtures.

Finally, the fertilizing products containing only dried blood have a plurality of drawbacks such as the difficulty of application of the product as it is, both in powder and liquid form and the lateness of its peak effect, in relation to the period of application.

In view of the foregoing at present there is a need for a new and effective product for preventing and treating Iron chlorosis.

A general object of the present invention consists in eliminating or considerably reducing the drawbacks of the prior art.

One of the principal objects of the present invention consists in providing a micro granular fertilizer for the prevention and treatment of Iron chlorosis which is so effective to avoid the need for repeated treatments of the soil.

Another object of the present invention consists in the provision of a fertilizer for preventing and treating Iron chlorosis which is in a granulated form which allows an easy application to the soil.

A further object of the present invention resides in the provision of a fertilizing composition for preventing and treating Iron chlorosis having a high efficiency even when applied to non irrigated areas.

SUMMARY OF THE INVENTION

With the foregoing and other objects in view, there is provided, in accordance with the invention, a micro granular fertilizer for the prevention and treatment of Iron chlorosis comprising a micro granular fertilizer for the prevention and treatment of Iron chlorosis comprising animal blood, a ferrous salt, and a lighim derivative.

A suitable ferrous salt is ferrous sulphate, conveniently in the heptahydrate form. Advantageously, the ferrous sulphate heptahydrate is produced by the action of sulphuric acid on iron (Faith, Keyes and Clark, "Industrial Chemicals", F. A. Lowenheim, M. K. Moran-Wiley Itersci., NY $4^{th}$ ed., 1975) and when used in the preparation is in blue-green crystalline form, monoclinic, water soluble, with a density of 1.897.

Applicants have found that, in the formulation of the invention, an unexpectedly effective source of Iron derives when animal blood, carrying a naturally chelated Iron form, is associated with Ferrous salts, especially Ferrous sulphate and derivatives of lignin.

The term derivatives of the lignine comprises the lignine and the naturally occurring lignine based materials such as ligninsulphonate of Calcium, ligninsulphonate of Iron and ligninsulphonate of Magnesium, and mixtures thereof. Advantageously, the content of derivatives of lignin in the formulation of the fertilizer of the invention varies of from 2 to 10% by weight based on the total amount of the composition.

DESCRIPTION OF THE PREFERRED EMBODIMENTS

In accordance with a preferred embodiment of the invention, the fertilizer is in the form of granules having a size of from 0.1 to 1.5 mm, preferably of 0.5 to 1 mm. When these parameters are met, remarkable results in terms of prolonged and effective availability of Iron to the plant are achieved.

In accordance with a further embodiment of the present invention, an animal blood degreased and dried by means of a spray-drying technique is used.

With the term spray-drying a technique is meant for drying heat sensitive products in a brief time, usually 3–5 seconds, by making a liquid state finely dispersed in a gas zone, at a high temperature. Because of the high surface/volume ratio, evaporation continues until the particles are completely dried, and the temperature of the solid matter remains below the temperature at the exit of the dryer. By subjecting the animal blood to the spray drying technique its bio-availability properties are maintained as well as its capacity to bind metals. The association in a single formulation of animal blood of this type with a ferrous salt and lignine or derivatives thereof results in a fertilizing synergistic effect in terms of Fe ions which become easily soluble in the soil and promptly available by plants.

A suitable animal blood obtained by the spray-drying technique conveniently contains at least 13% by weight of Nitrogen, less than 7% by weight of water, and has a solubility in water of at least 85%.

Preferably, the ratio between animal blood and the ferrous salt is between 1:0.2 and 1:1.

The granular fertilizer composition of the invention is preferably localized along plant rows or topdressed to established turf.

According to another embodiment of the invention, the fertilizer composition further comprises an agronomically acceptable additive, advantageously selected from the group consisting of cellulose derivatives, starch derivatives, carbohydrates, polyvinyl alcohol, and mixtures thereof and/or a further fertilizing agent, advantageously selected from the group consisting of a Phosphate fertilizer, a Nitrogen fertilizer, a Potassium fertilizer, a Magnesium fertilizer and mixtures thereof.

By way of an example useful Phosphate fertilizers are selected from the group consisting of superphosphates, ground soft phosphate rock, Aluminum-calcium phosphate, Ammonium phosphate and mixtures thereof; useful Nitrogen fertilizers are selected from the group consisting of urea, urea-formaldehyde, methylenurea, Ammonium nitrate, Ammonium sulphate and mixtures thereof.

The following examples are given to illustrate but not to limit the invention.

EXAMPLE 1

Preparation 1

In a powder-mixer, 50 kg of powdered dry blood, degreased and dried following the method described above, 30 kg of ferrous sulphate heptahydrate, 15 kg of starch and 5 kg of ligninsulphonate of Calcium, are mixed. After the moistening, drying and sieving processes, a micro granular fertilizer results with granules of sizes between 0.5 and 1.0 mm.

EXAMPLE 2

Preparation 2

Following the method described above in example 1, 20 kg of powdered dry blood (degreased and dried as previously described), 10 kg of monohydrated Magnesium sulphate, 12 kg of Potassium sulphate, 26 kg of Urea, 8 kg of Ammonium sulphate and 4 kg of ligninsulphonate of iron, are mixed. After the moistening, drying and sieving processes, a micro granular fertilizer results with granules of sizes between 0.5 and 1.0 mm.

EXAMPLE 3

Preparation 3

Following the method described in the examples above, 23 kg of powdered dry blood (degreased and dried as previously described), 10 kg of powdered Monoammonium phosphate, 15 kg of Ferrous sulphate heptahydrate, 7 kg of monohydrated Magnesium sulphate, 24 kg of Potassium sulphate, 15 kg of Ammonium sulphate and 6 kg of ligninsulphonate of Iron, are mixed. After the moistening, drying and sieving processes, a micro granular fertilizer results with granules of sizes between 0.5 and 1.0 mm.

EXAMPLE 4

Application

A split-plot three-replicated experiment was carried out on a uniform patch of Lolium perenne on a sandy-loam soil having pH 7.6.

The product was experimented according the following treatments:

1) Control
2) 30 g/m$^2$ of preparation topdressed over the entire surface
3) 9 g/m$^2$ of Ferrous sulphate +0.9 g/m$^2$ FeEDTA.

Over a period of 90 days, the intensity of the green color (chlorophyll) and the iron content were periodically measured.

The experiment showed that the new product enhanced plant greening up over a longer period compared to traditional products.

TABLE 1

*Lolium perenne.* Amount of Chlorophyll measured (mg/g FM).
Data on the same line with a different letter are statistically different (LSD 0.05)

| DAYS AFTER APPLICATION | TEST PATCH | PREPARATION 1 | FERROUS SULPHATE + FeEDTA |
|---|---|---|---|
| 7 | 0.75 a | 0.83 a | 0.80 a |
| 15 | 0.72 b | 0.88 a | 0.82 ab |
| 30 | 0.67 b | 0.86 a | 0.80 a |
| 35 | 0.65 b | 0.89 a | 0.77 ab |
| 60 | 0.61 b | 0.85 a | 0.72 b |
| 90 | 0.60 b | 0.82 a | 0.67 b |

TABLE 2

*Lolium perenne*. Amount of Iron measured (mg/g DM).
Data on the same line with a different letter are statistically
different (LSD 0.05)

| DAYS AFTER APPLICATION | TEST PATCH | PREPARATION 1 | FERROUS SULPHATE + FeEDTA |
|---|---|---|---|
| 7 | 28 b | 35 a | 38 b |
| 15 | 24 b | 38 a | 36 b |
| 30 | 23 b | 39 a | 34 b |
| 45 | 21 c | 42 a | 33 b |
| 60 | 19 c | 38 a | 29 b |
| 90 | 18 c | 36 a | 25 b |

EXAMPLE 5

On four areas of production of 4–6 year old Abate and Morettini pears, grafted on BA29, comparing traditional techniques (12 kg/ha FeEDDHA localized along the rows at the beginning of sprouting)

Preparation 3 was applied at the rate of 90 kg/ha per application.

The control received a supplement of Nitrogen, Phosphate and Potassium chemical fertilizers to balance the incidental addition of these elements with the used preparation.

The results indicated an identical or improved greening up effect over the control area which was maintained for the entire season, and at a lower cost.

TABLE 3

Contents of the major nutritional elements with a marked
greening up effect in the leaves of the pear trees treated
with traditional soil-applied chelate or with preparation 3.

| TREATMENT | EDDHA CHELATE | PREPARATION 3 |
|---|---|---|
| Test 1 (Abate pear tree) | | |
| Magnesium (Mg) g/kg | 3.10 | 3.60 |
| Iron mg/kg | 124 | 196 |
| Test 2 (Abate pear tree) | | |
| Magnesium (Mg) g/kg | 3.30 | 3.20 |
| Iron mg/kg | 43 | 77 |
| Test 3 (Morettini pear tree) | | |
| Magnesium (Mg) g/kg | 2.20 | 2.90 |
| Iron mg/kg | 121 | 120 |
| Test 4 (Abate pear tree) | | |
| Magnesium (Mg) g/kg | 2.50 | 3.00 |
| Iron mg/kg | 164 | 152 |

What is claimed is:

1. A micro granular fertilizer for the prevention and treatment of Iron chlorosis comprising a ferrous salt, to provide a readily available Iron form, and animal blood in association with a lignin derivative, to provide a prolonged Iron release.

2. The micro granular fertilizer according to claim 1, wherein said ferrous salt is ferrous sulphate.

3. The micro granular fertilizer according to claim 2, wherein said ferrous sulphate is ferrous sulphate heptahydrate.

4. The micro granular fertilizer according to claim 1, wherein the granules have a size of from 0.1 to 1.5 mm.

5. The micro granular fertilizer according to claim 1, wherein the animal blood is degreased and dried by means of a spray-drying technique.

6. The micro granular fertilizer according to claim 1, wherein the animal blood contains at least 13% by weight of nitrogen, less than 7% by weight of water, and wherein it has a solubility in water of at least 85%.

7. The micro granular fertilizer according to claim 1, wherein the ratio between animal blood and ferrous salt is between 1:0.2 and 1:1.

8. The micro granular fertilizer according to claim 1, wherein the amount of lignin derivative is between 2 and 10% by weight.

9. The micro granular fertilizer according to claim 1, wherein said lignin derivative is selected from the group consisting of ligninsulphonate of calcium, ligninsulphonate of iron, ligninsulphonate of magnesium and mixtures thereof.

10. The micro granular fertilizer according to claim 1, further comprising an additive selected from the group consisting of cellulose derivatives, starch derivatives, carbohydrates, polyvinyl alcohol and mixtures thereof.

11. The micro granular fertilizer according to claim 1, further comprising a fertilizing agent selected from the group consisting of a Phosphate fertilizer, a Nitrogen fertilizer, a Potassium fertilizer, a Magnesium fertilizer and mixtures thereof.

12. The micro granular fertilizer according to claim 11, wherein the Phosphate fertilizer is selected from the group consisting of superphosphates, ground soft phosphate rock, Aluminum-calcium phosphate, Ammonium phosphate and mixtures thereof.

13. The micro granular fertilizer according to claim 11, wherein the Nitrogen fertilizer is selected from the group consisting of urea, urea-formaldehyde, methylenurea, Ammonium nitrate, Ammonium sulphate and mixtures thereof.

14. A method of treatment of Iron chlorosis comprising the application to a soil of a micro granular fertilizer comprising a ferrous salt, to provide a readily available Iron form, and animal blood in association with a lignin derivative, to provide a prolonged Iron release to the soil.

15. The method according to claim 14, wherein said application consists in a localization of the fertilizing composition along plant rows.

* * * * *